(12) United States Patent
Abney et al.

(10) Patent No.: US 8,505,443 B2
(45) Date of Patent: Aug. 13, 2013

(54) COOKING MEDIUM SYSTEMS HAVING A SINGLE MECHANICAL LEVER AND CONTROL ASSISTED FILTERING AND DRAINING

(75) Inventors: Trent Abney, Eaton, OH (US); Steve Werts, Eaton, OH (US); Tim Landwehr, Eaton, OH (US); Gary Summons, Eaton, OH (US); Gary Mercer, Eaton, CA (US)

(73) Assignee: Henny Penny Corporation, Eaton, OH (US)

( * ) Notice: Subject to any disclaimer, the term of this patent is extended or adjusted under 35 U.S.C. 154(b) by 377 days.

(21) Appl. No.: 12/778,631

(22) Filed: May 12, 2010

(65) Prior Publication Data

US 2011/0168032 A1 Jul. 14, 2011

Related U.S. Application Data

(60) Provisional application No. 61/177,644, filed on May 12, 2009.

(51) Int. Cl.
*A47J 37/12* (2006.01)
(52) U.S. Cl.
USPC ............ 99/408; 99/446; 99/444; 210/167.28; 210/DIG. 8

(58) Field of Classification Search
USPC .................. 99/408, 403, 446, 444; 210/167, 210/DIG. 8, 167.28
See application file for complete search history.

(56) References Cited

U.S. PATENT DOCUMENTS

| | | | | |
|---|---|---|---|---|
| 4,420,006 A | * | 12/1983 | Moore et al. | 134/167 R |
| 4,974,501 A | * | 12/1990 | Grob et al. | 99/408 |
| 5,839,360 A | * | 11/1998 | Williams | 99/408 |
| 2002/0038604 A1 | * | 4/2002 | Chikazawa et al. | 99/330 |
| 2008/0196596 A1 | * | 8/2008 | Forrest et al. | 99/408 |
| 2009/0084273 A1 | * | 4/2009 | Lackman et al. | 99/408 |

* cited by examiner

*Primary Examiner* — Reginald L Alexander
(74) *Attorney, Agent, or Firm* — Baker Botts L.L.P.

(57) ABSTRACT

A cooking apparatus includes a first and second cooking vessel, a drain manifold connecting the first and second cooking vessel to a drain container for storing cooking medium, a first drain valve and second drain valve configured to connect the first and second cooking vessel with the drain container. A first drain lever selectively opens and closes the first drain valve, and a second drain lever selectively opens and closes the second drain valve. A first and second drain lever indicator indicate an operational status of the first and second drain valves, respectively. A controller monitors the first and second drain valve. When the first drain valve is open, the second drain lever indicator indicates a warning when the second drain lever is operated. When the second drain valve is open, the first drain lever indicator indicates a warning when the first drain lever is operated.

20 Claims, 4 Drawing Sheets

COOKING MEDIUM SYSTEMS HAVING A SINGLE MECHANICAL LEVER AND CONTROL ASSISTED FILTERING AND DRAINING

CROSS-REFERENCE TO RELATED APPLICATIONS

This application claims the benefit of U.S. Provisional Patent Application. No. 61/177,644, filed May 12, 2009.

BACKGROUND OF THE INVENTION

1. Field of the Invention

The present invention relates generally to cooking medium systems having control-assisted filtering and draining.

2. Description of Related Art

Known fryers, e.g., open-well fryers and pressure fryers, are used to cook various food products, e.g., poultry, fish, potato products, and the like. Such fryers may include one or more cooking vessels, e.g., fryer pots, which may be filled with a cooking medium, e.g., an oil, a liquid shortening, or a meltable-solid shortening. Such fryers also include a heating element, e.g., an electrical heating element, such as a heating oil medium, or a gas heating element, such as a gas burner and gas conveying tubes, which heat the cooking medium in the cooking vessel. The amount of time sufficient to cook or to complete the cooking of the food product at a given cooking temperature depends on the type of food product which is cooked. Moreover, the cooking medium may be used during several cooking cycles before the cooking medium inside the cooking vessel is filtered, replaced, or supplemented with a new or filtered supply of cooking medium.

This process may require a plurality of tanks, each containing a cooking medium, and each tank having its own regulation system. Cooking medium may be filtered periodically to maintain cooking quality and to prolong the operational lifetime of the cooking medium. The filtering process removes cooking by-product, e.g., suspended food particles, ranging from dust-sized particles to larger pieces of crackling and small pieces of food product. A known filtering process requires the manual opening and closing of multiple valves at different time intervals for emptying, washing, filtering, and refilling of the frypot. In known systems, there may be multiple steps required to perform the filtering operations.

Moreover, known fryer apparatuses may have multiple frypots for cooking various types of foods. In a system with multiple frypots, each frypot may be designated for cooking a different food product, e.g., chicken, "french-fried potatoes," and fish. The flavor characteristics of each of these food products may become infused to a greater or a lesser degree in the cooking medium. Each of these cooking vessels may use a single drain container, e.g., a container in which cooking medium is stored while being filtered. Nevertheless, these known systems may require a large amount of space, because each frypot may require its own drain container.

In order to solve these problems, a known system may use fewer drain containers than frypots. Nevertheless, such systems may result in multiple frypots being filtered at the same time, thereby mixing cooking medium from frypots designated for different food products during filtering and replacement. This same-time filtering may adversely affect food quality, e.g., cooking chicken in a significant quantity of fish-flavored cooking medium may result in, e.g., "fish-flavored" chicken. Moreover, if the drain container is not made to be sufficiently large to handle the cooking medium from multiple frypots, then filtering more than one frypot at the same time may lead to overflow of cooking medium in the drain container, thereby wasting the cooking medium and decreasing the efficiency of the system. As demand for healthier food increases, food suppliers have begun to replace less expensive cooking media with more expensive, healthier cooking media. One such change is the recent demand for cooking media with zero trans fats. This specific type of cooking medium is more expensive than other known cooking media, and it thereby may be inefficient to waste cooking medium.

SUMMARY OF THE INVENTION

Therefore, a need has arisen for systems and methods for a cooking apparatus that overcome these and other shortcomings of the related art. A technical advantage of the invention is that a system of a lever for opening a drain valve, and an indicator light indicating when that lever should be pulled, and when it may not be pulled, may reduce the size and complexity of the fryer. Additionally, by positioning the drain lever at a predetermined position with respect to a user, and within the profile of the drain lever, an incident of an operator of the system's legs inadvertently activating the lever may be reduced.

In an embodiment of the invention, a system for delivering and filtering a cooking medium of a cooking apparatus comprises at least one cooking vessel, a drain manifold configured to be in fluid communication with the at least one cooking vessel, a drain container configured to store used cooking medium, and configured to selectively be in fluid communication with the drain manifold via a first flow path, a drain valve configured to selectively place the at least one cooking vessel in fluid communication with the at least one drain container, a drain lever configured to selectively open and close the drain valve, a drain lever indicator configured to indicate an operational status of the at least one cooking vessel, a filter pump configured to pump the cooking medium in the drain container back into the cooking vessel, and a controller configured to monitor the state of the first drain valve and the second drain valve.

In another embodiment of the invention, a system for delivering and filtering a cooking medium of a cooking apparatus comprises a first cooking vessel, a second cooking vessel, a drain manifold configured to be in fluid communication with at least one of the first and second cooking vessels, at least one drain container configured to store used cooking medium, and configured to selectively be in fluid communication with the drain manifold via a first flow path, a first drain valve configured to selectively place the first cooking vessel in fluid communication with the at least one drain container, a second drain valve configured to selectively place the second cooking vessel in fluid communication with the at least one drain container, a first drain lever configured to selectively open and close the first drain valve, a second drain lever configured to selectively open and close the second drain valve, a first drain lever indicator configured to indicate an operational status of the first drain valve, a second drain lever indicator configured to indicate an operational status of the second drain valve, a filter pump configured to pump the cooking medium in the drain container back into the cooking vessel, and a controller configured to monitor the state of the first drain valve and the second drain valve, wherein when the first drain valve is open, the second drain lever indicator indicates a warning status when the second drain lever is operated to open the second drain valve, and when the second drain valve is open, the first drain lever indicator indicates a warning status when the first drain lever is operated to open the first drain valve.

In still another embodiment of the invention, a system for delivering and filtering a cooking medium of a cooking apparatus, comprises a plurality of cooking vessels, a drain manifold configured to be in fluid communication with the plurality of cooking vessels, a drain container configured to store used cooking medium, and configured to selectively be in fluid communication with the drain manifold via a first flow path, a plurality of drain valves, each drain valve configured to selectively place a respective one of the plurality of cooking vessels in fluid communication with the at least one drain container, a plurality of drain levers respectively coupled to the plurality of drain valves, each drain lever configured to selectively open and close a corresponding one of the plurality of drain valves, a plurality of drain lever indicators, each configured to indicate an operational status of a corresponding one of the plurality of cooking vessels, a filter pump configured to pump the cooking medium in the drain container back into the cooking vessel, and a controller configured to monitor the status of each of the plurality of cooking vessels, and each of the plurality of drain valves, wherein when one of the plurality of drain levers is operated, the controller produces an indication on the corresponding drain lever indicator when any of the drain valves not corresponding to the operated drain lever is already open.

Other objects, features, and advantages of the present invention will be apparent to persons of ordinary skill in the art in view of the foregoing detailed description of the invention and the accompanying drawings.

BRIEF DESCRIPTION OF THE DRAWINGS

For a more complete understanding of the present invention, needs satisfied thereby, and the objects, features, and advantages thereof, reference now is made to the following description taken in connection with the accompanying drawings.

DETAILED DESCRIPTION OF EMBODIMENTS OF THE INVENTION

Preferred embodiments of the present invention, and their features and advantages, may be understood by referring to FIGS. 1-4, like numerals being used for corresponding parts in the various drawings.

Figure 1:
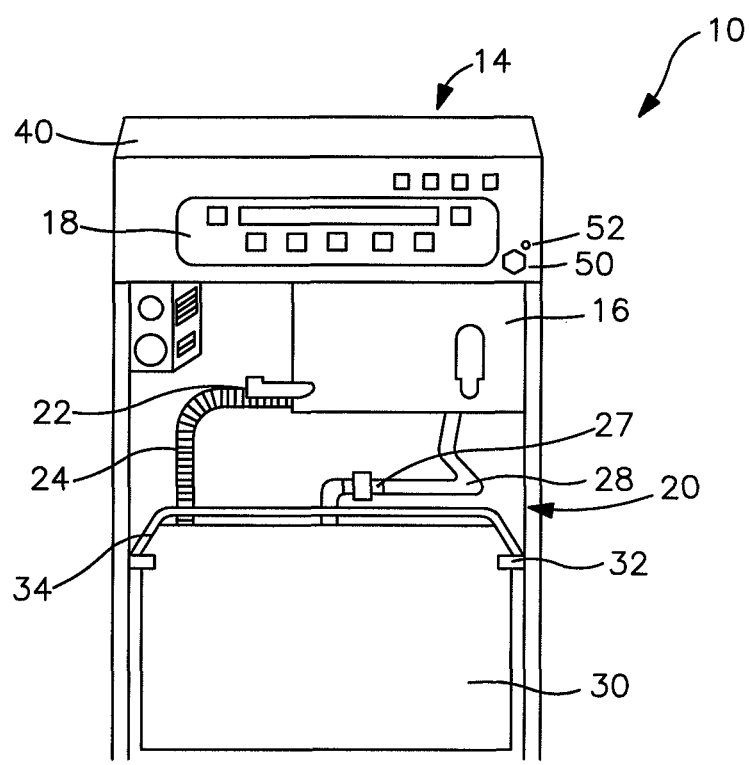
FIG. 1 is a front view of a fryer apparatus using a drain lever and an LED indicator, according to an embodiment of the invention.

According to FIG. 1, a fryer apparatus 10 may comprise a single frypot 16 and a single drain pan 30. Although only one frypot 16 and one drain pan 30 are depicted in FIG. 1, in other embodiments of the invention, multiple frypots or multiple drain pans, or both, may be used. Fryer apparatus 10 comprises a frypot 16 having an open top 14 for receiving a food product. A cabinet 20, shown without a door for illustrative purposes, may comprise brackets 32 supporting a drain pan 30 having a filter (not shown). Drain pan 30 comprises a handle 34 that allows drain pan 30 to be removed from cabinet 20 for cleaning. Drain pan 30 may be fluidly connected to frypot 16 via a drain line 24 and a filter pipe 28. A filter pump 27 may be positioned on filter pipe 28, for drawing cooking medium into frypot 16 from pan 30. Frypot 16 comprises a drain valve handle 22 that operates a drain valve (not shown) for selectively permitting cooking medium to drain from frypot 16 via drain line 24. A visual control readout panel 18 may be positioned on a front panel 40 of fryer apparatus 10. Frypot 16 also may comprises a filter valve (not shown) which may operate manually, electronically, e.g., via a solenoid valve, or both, for selectively permitting the introduction of cooking medium to frypot 16.

Figure 2:
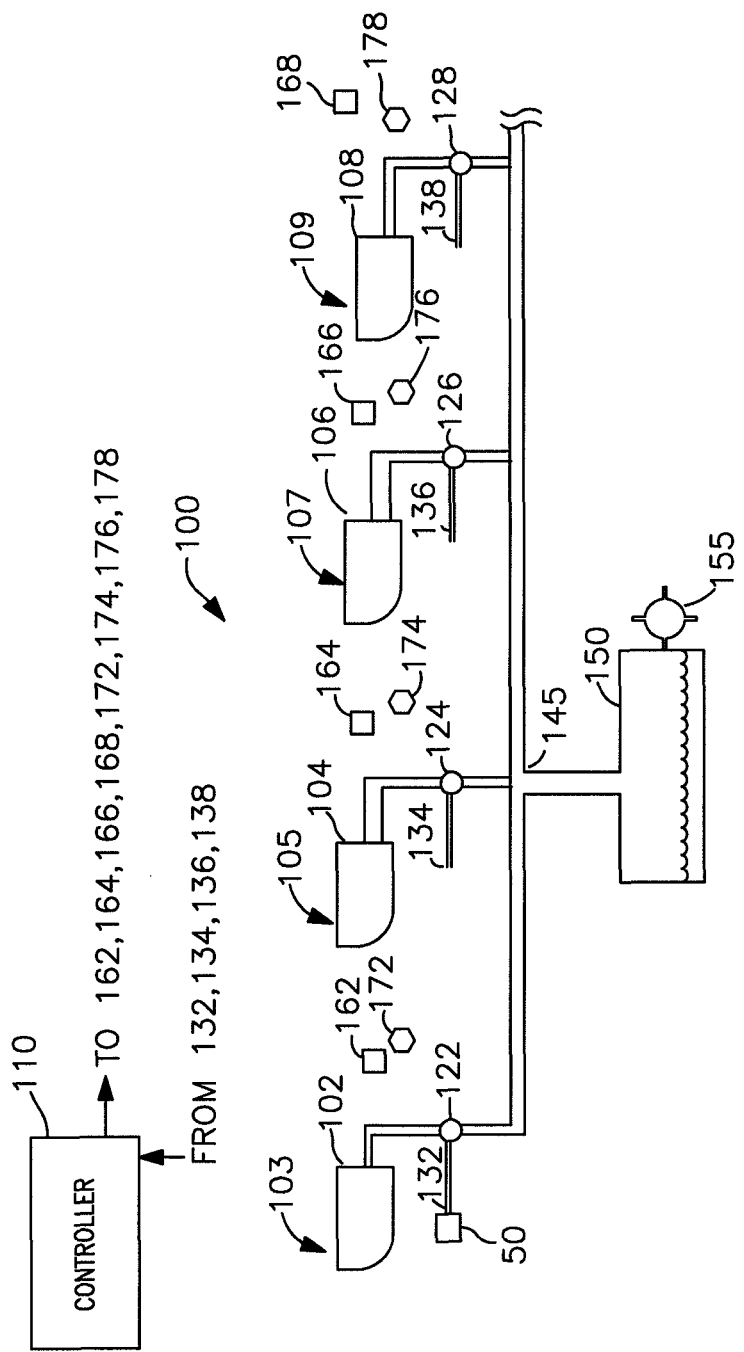
FIG. 2 is a schematic view of a cooking medium system using a single drain lever and indicator for each frypot, according to an embodiment of the invention.

FIG. 2 shows a cooking medium system incorporating more than one frypot, such as a fryer apparatus 100, according to an embodiment of the present invention. Fryer apparatus 100 may comprise at least one cooking vessel 102, 104, 106, 108, e.g., a frypot, which may be configured to hold a cooking medium, e.g., an oil, a liquid shortening, a meltable-solid shortening, or the like. Cooking vessels 102, 104, 106, 108 may be similar to frypot 16 shown in FIG. 1. Each cooking vessel 102, 104, 106, 108 may have an opening 103, 105, 107, 109, respectively, for receiving a food product. A heating element (not shown), e.g., a heating oil medium, a gas jet, an electric heating element, or the like, may be positioned within cooking vessels 102, 104, 106, and 108. The heating element may apply heat to the cooking medium within cooking vessels 102, 104, 106, 108 until the cooking medium reaches a predetermined temperature, and also may apply heat to maintain the cooking medium within vessels 102, 104, 106, 108 at a predetermined maintenance temperature. Fryer apparatus 100 may be configured for use in a gas or electric fryer apparatus. Although vessels 102, 104, 106, 108 are shown as configured for an open-well fryer, cooking medium system 100 also may be used in a pressure fryer.

Each cooking vessel 102, 104, 106, 108 may comprise a drain at an inlet of a drain path, which may be fluidly connected to a drain manifold 145 at a second end opposite the first end. Drain manifold 145 also may fluidly connected to a drain container, e.g., a filter container, 150, e.g., a drain pan or a filter canister. Cooking medium within cooking vessels 102, 104, 106, 108, may be held in place by drain valves 122, 124, 126, and 128, respectively. Each drain valve 122, 124, 126, and 128, may be selectively opened and closed by a drain lever. Specifically, drain levers 132, 134, 136, and 138 may be configured to selectively open and close their respective drain valves 122, 124, 126, and 128, as will be described in more detail with respect to FIGS. 4A and 4B. Moreover, as will be described in more detail with respect to FIGS. 4A and 4B, drain levers 132, 134, 136, and 138 may be positioned at the front of the unit, with no obstructions, e.g., not behind any doors or panels, for ease of access. Additionally, the drain levers may be positioned at a height level and a horizontal offset distance such that an operator of the cooking medium system 100 may not inadvertently contact the drain levers. In an embodiment of the invention, when an operator pulls a drain lever, e.g., drain lever 132, then the corresponding drain valve, e.g., drain valve 122, may open, which may allow cooking medium to flow from the corresponding cooking vessel, e.g., cooking vessel 102, to the drain container 150. Once in drain container 150, the cooking medium may be filtered and pumped by a filter pump 155 back to its respective cooking vessel, via a return flow path (not shown).

In another embodiment of the invention, drain levers 132, 134, 136, and 138 may be operated by a solenoid configured to open drain levers 132, 134, 136, and 138, upon receiving a signal from controller 110. In still another embodiment of the invention, drain levers 132, 134, 136, and 138 may be replaced with electronic or mechanical switches. Such switches may be operated by an operator using the cooking medium system 100, or may be electronically controlled by controller 110.

Controller 110 monitors the status of each of drain levers 132, 134, 136, and 138. Controller 110 also may monitor the status of each of drain valves 122, 124, 126, and 128. In another embodiment of the invention, controller 110 also may monitor the level and temperature of cooking medium in each of cooking vessels 102, 104, 106, and 108. In another embodiment of the invention, controller 110 also may monitor the level of cooking medium within drain container 150, and may use the level information to determine when it is appropriate to drain one or more of cooking vessels 102, 104, 106, and 108.

Each cooking vessel 102, 104, 106, 108 also comprises a corresponding indicator 162, 164, 166, and 168. Each indicator, e.g., beacon, may be used to guide, or alert, or both, an operator of the cooking medium system 100 during frying and filtering operations. As will be described in more detail herein with respect to FIG. 3, indicators 162, 164, 166, and 168 may be positioned substantially adjacent to the corresponding drain levers 132, 134, 136, and 138. In another embodiment of the invention, indicators 162, 164, 166, and 168 may be built into corresponding drain levers 132, 134, 136, and 138.

In an embodiment of the invention, each indicator 162, 164, 166, and 168 may comprise one or more Light Emitting Diodes ("LED"). In another embodiment of the invention, each indicator may be an LED display configured to display a digit from 0-9. In still another embodiment of the invention, each indicator may be a digital display, e.g., an illuminated Liquid Crystal Display ("LCD") screen. Each indicator 162, 164, 166, and 168 may receive a signal from controller 110 to activate indication. Active indication may comprise steady illumination of a single color, flashing light of a single color, or illumination or flashing light of multiple colors, in a set pattern. In an embodiment of the invention, each pattern of color, or illumination, or both, may correspond to a status of the cooking medium system 100. In another embodiment of the invention, controller 110 may be implemented with a separate display screen, either positioned on cooking medium system 100, or remote from cooking medium system 100. In this embodiment, controller 110 may comprise secondary auditory and visual indicators that may work separately from or in conjunction with indicators 162, 164, 166, and 168.

Specifically, each indicator 162, 164, 166, and 168 may indicate whenever its corresponding drain lever 132, 134, 136, or 138 is in an incorrect position relative to fryer operation. Such determination may be made by controller 110 based on one or more factors, including level of cooking medium in drain container 150, time between filtration of oil in cooking vessels 102, 104, 106, 108, age of oil in cooking vessels 102, 104, 106, 108, and type of food to be cooked in cooking vessels 102, 104, 106, 108. Each indicator 162, 164, 166, and 168 also may indicate when controller 110 realizes it is time for the corresponding cooking vessel 102, 104, 106, or 108 to have its cooking medium filtered. Further, each indicator 162, 164, 166, and 168 may indicate when a drain opening or a drain closing is to occur, e.g., within the control filter routine. In addition, each indicator 162, 164, 166, and 168 may indicate status indicators outside the filtering routine, e.g., time for disposal of cooking medium within the corresponding cooking vessel 102, 104, 106, or 108.

In this manner, an operator of cooking medium system 100 may perform complex filter operations on multiple cooking vessels, without sophisticated training, merely by interpreting indicators 162, 164, 166, 168, and, in some embodiments, secondary indicators from controller 110. In this manner, operations and actions, both simple and complex, may be performed at the correct moment, thereby lending efficiency and consistency to the routine operation of the cooking medium system 100. Indicators 162, 164, 166, and 168 may vary in complexity from simple "ON" or "OFF" states to complex series of flashes and colors. In an embodiment of the invention, the indicator light color is a specific shade of blue, which may contrast with the other lights on the face of the cooking medium system 100. In another embodiment of the invention, the indicator light is brighter than the surrounding lights on the face of cooking medium system 100. In yet another embodiment of the invention, secondary indicators from controller 110 include displaying messages, such as "PULL LEVER 1" or "OPEN DRAIN VALVE," which instruct an operator to perform specific actions to carry out various cooking and filtering procedures on cooking medium system 100. These messages may function to instruct an operator independently of indicators 162, 164, 166, and 168, or the messages displayed on controller 110 may function in conjunction with indicators 162, 164, 166, and 168 to instruct an operator to perform various cooking and filtering procedures on cooking medium system 100.

In an embodiment of the invention, in addition to indicators 162, 164, 166, and 168, cooking medium system 100 also may comprise auditory indicators 172, 174, 176, and 178. Controller 110 also may control these auditory indicators 172, 174, 176, and 178. The auditory indicators may be configured to indicate in the same manner as indicators 162, 164, 166, and 168. In another embodiment, auditory indicators 172, 174, 176, and 178 may be incorporated as part of controller 110. In still another embodiment, controller 110 may further comprise secondary auditory indicators.

In another embodiment, auditory indicators may be configured to indicate only during specific events, e.g., a respective drain lever is in an incorrect position relative to cooking medium system 100 operation. Auditory indicators may be optionally omitted, and may be configured to be selectively turned off, for use in environments in which they may be inappropriate or unwanted.

Figure 3A:
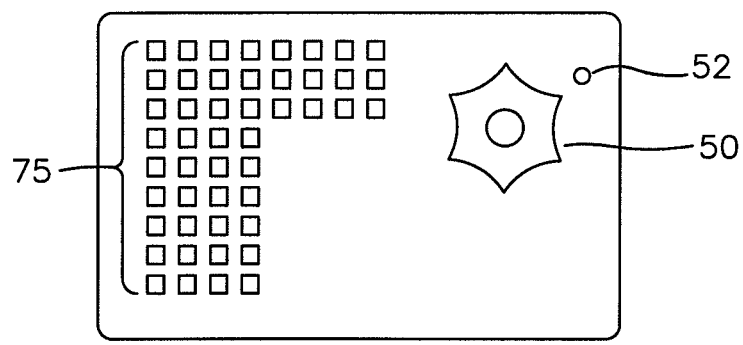
FIG. 3A is an enlarged view of a portion of a front panel of a frypot according to an embodiment of the invention, in which the indicator is positioned substantially adjacent to the drain lever.
Figure 3B:
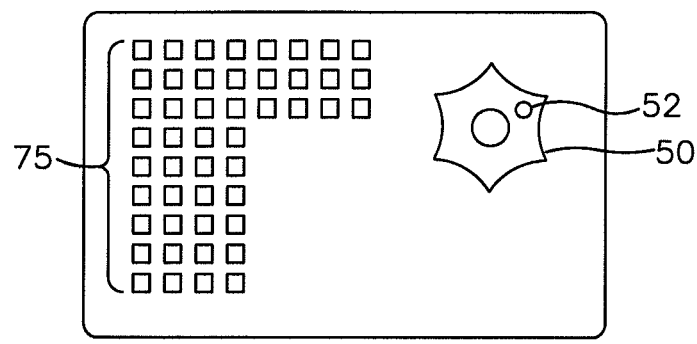
FIG. 3B is an enlarged view of a portion of a front panel of a frypot according to another embodiment of the invention, in which the indicator is positioned on the drain lever.
Figure 3C:
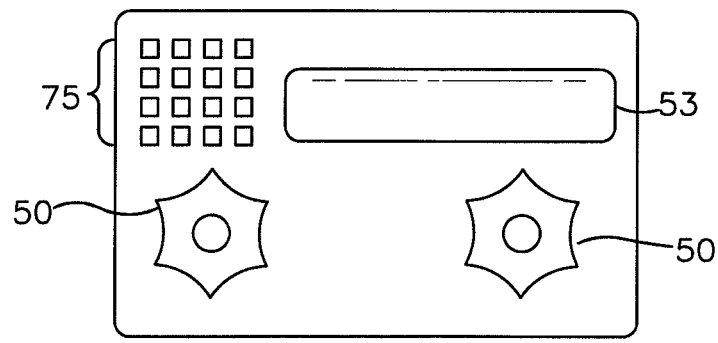
FIG. 3C is an enlarged view of a portion of a front panel of a frypot according to another embodiment of the invention, in which the indicator is positioned on the drain lever.

FIGS. 3A to 3C show various embodiments of the drain levers and the indicator lights. In an embodiment of the invention, as shown in FIG. 3A, each drain lever may have a knob 50. An indicator, e.g., indicator 52, may be positioned substantially adjacent to knob 50, such that it may plainly be understood that indicator 52 refers to knob 50, even in embodiments which comprise multiple knobs 50 and indicators 52. In another embodiment of the invention, as shown in FIG. 3B, indicator 52 may be mounted directly on knob 50. In an embodiment, wiring to connect indicator 52 may travel through the respective drain lever and to the controller 110. In another embodiment, indicator 52 may communicate with controller 110 wirelessly, e.g., using infrared or other wireless technology. Moreover, each panel may comprise other display elements 75, which may comprise buttons, dials, readout screens, indicator lights, and any combination of these.

In still another embodiment of the invention, as shown in FIG. 3C, one or more indicators may be displayed on a digital screen 53, which may be positioned in proximity to one or more knobs 50 of respective drain levers. Digital screen 53 may act as one or more indicators for each drain lever, and may indicate the appropriate drain lever using numbers, arrows, or any other suitable signal. Although the embodiment shown in FIG. 3C does not show separate indicators 52, in other embodiments of the invention, separate indicators 52 may be used in conjunction with digital screen 53. As in the embodiments shown in FIGS. 3A and 3B, the embodiment shown in FIG. 3C also may include further display elements 75.

Figure 4A:
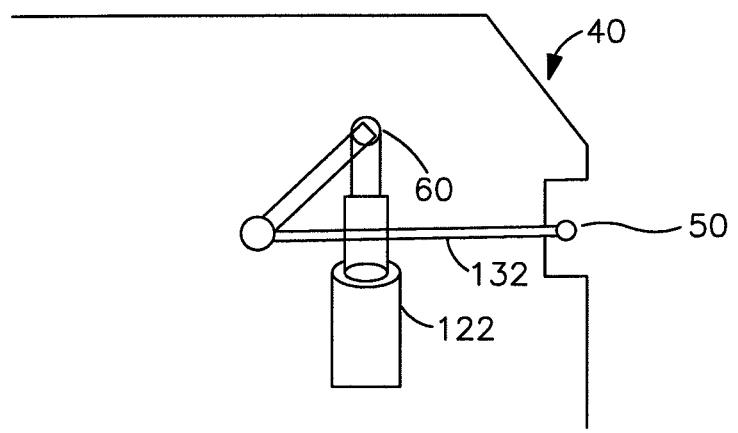
FIG. 4A is an enlarged, simplified view of the mechanical drain lever when the drain valve is in the closed position, according to an embodiment of the invention.
Figure 4B:
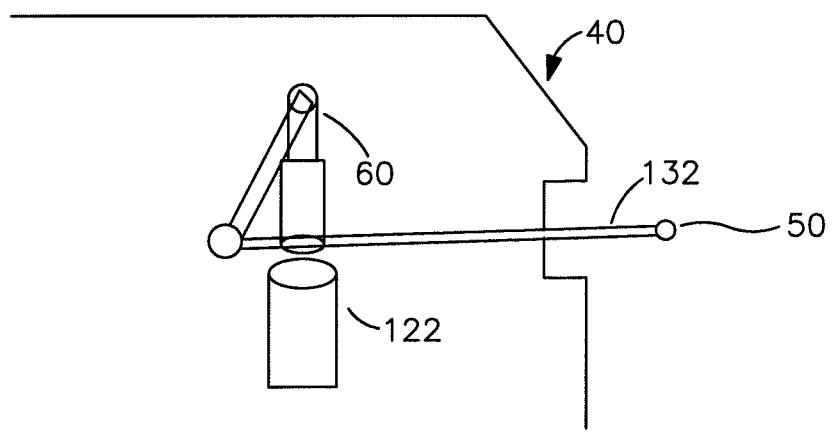
FIG. 4B is an enlarged, simplified view of the mechanical drain lever when the drain valve is in the open position, according to an embodiment of the invention.

FIGS. 4A and 4B describe the operation and positioning of a drain lever, e.g., drain lever 132, in more detail. FIGS. 4A and 4B show a simplified version of a simple valve system used to open and close drain valve 122. For ease of explanation, cooking vessels 102, 104, 106, 108 are not specifically shown. Further, other portions of cooking medium system 100 which are not required to illustrate operation of drain valve 122. In an embodiment of the invention, drain lever 132 uses simple mechanical advantage linkage do drain valve stem crank 60. This mechanism may be used to improve ease of use, and to reduce a chance of failure of the drain valve. In an embodiment of the invention, drain valve 122 is closed when drain lever 132 is pushed closed, e.g., in a first position, as shown in FIG. 4A, and drain valve 122 is open when drain lever 132 is pulled open, e.g., in a second position, as shown in FIG. 4B. Such a configuration may be intuitive for an operator of cooking medium system 100. Moreover, in an embodiment of the invention, language-neutral signage may be added near each drain lever to indicate its operation.

As shown in FIG. 4A, when drain lever 132 is pushed in, drain valve 122 is closed, and the cooking vessel 102 may recognize the position of drain lever 122 or drain valve 133, and may perform the next steps in the selected routine, which may be controlled by controller 110. In the closed position, knob 50 of drain lever 132 is set in to the cooking medium system 100, and does not protrude beyond cooking medium system 100's outer wall. In this manner, when cooking vessel 102 is cooking, e.g., drain valve 122 is closed, a chance that an operator may accidentally engage drain lever 132 or knob 50, may be decreased.

While the invention has been described in connection with preferred embodiments, it will be understood by those of ordinary skill in the art that other variations and modifications of the preferred embodiments described above may be made without departing from the scope of the invention. Other embodiments will be apparent to those of ordinary skill in the art from a consideration of the specification or practice of the invention disclosed herein. The specification and the described examples are considered as exemplary only, with the true scope and spirit of the invention indicated by the following claims.

What is claimed is:

1. A system for delivering and filtering a cooking medium of a cooking apparatus, comprising:
    at least one cooking vessel;
    a drain manifold configured to be in fluid communication with the at least one cooking vessel;
    a drain container configured to store used cooking medium, and configured to selectively be in fluid communication with the drain manifold via a first flow path;
    a drain valve configured to selectively place the at least one cooking vessel in fluid communication with the at least one drain container;
    a drain lever configured to selectively open and close the drain valve;
    a drain lever indicator configured to indicate an operational status of the at least one cooking vessel;
    a filter pump configured to pump the cooking medium in the drain container back into the cooking vessel; and
    a controller configured to monitor the state of the drain valve, wherein the controller produces an indication on the drain lever indicator to indicate when a corresponding drain valve opening or closing is to occur in operation of the at least one cooking vessel.

2. The system of claim 1, wherein the drain lever indicator is configured to indicate whether the drain lever is pulled out or pushed in, and wherein when the drain lever is pulled out, the drain valve is open, and when the drain lever is pushed in, the drain valve is closed.

3. A system for delivering and filtering a cooking medium of a cooking apparatus, comprising:
    a first cooking vessel;
    a second cooking vessel;
    a drain manifold configured to be in fluid communication with at least one of the first and second cooking vessels;
    at least one drain container configured to store used cooking medium, and configured to selectively be in fluid communication with the drain manifold via a first flow path;
    a first drain valve configured to selectively place the first cooking vessel in fluid communication with the at least one drain container;
    a second drain valve configured to selectively place the second cooking vessel in fluid communication with the at least one drain container;
    a first drain lever configured to selectively open and close the first drain valve;
    a second drain lever configured to selectively open and close the second drain valve;
    a first drain lever indicator configured to indicate an operational status of the first drain valve;
    a second drain lever indicator configured to indicate an operational status of the second drain valve;
    a filter pump configured to pump the cooking medium in the drain container back into the cooking vessel; and
    a controller configured to monitor the state of the first drain valve and the second drain valve, wherein when the first drain valve is open, the second drain lever indicator indicates a warning status when the second drain lever is operated to open the second drain valve, and when the second drain valve is open, the first drain lever indicator indicates a warning status when the first drain lever is operated to open the first drain valve.

4. The system of claim 3, wherein the first drain lever comprises a knob positioned at an end of the first drain lever, and the first drain lever is configured to move between a first position in which the first drain valve is closed, and a second position in which the first drain valve is open, and wherein when the first drain lever is in the first position, the knob does not extend beyond a vertical plane formed by a front panel of the cooking apparatus.

5. The system of claim 4, wherein the second drain lever comprises a knob positioned at an end of the second drain lever, and the second drain lever is configured to move between a first position in which the second drain valve is closed, and a second position in which the second drain valve is open, and wherein when the second drain lever is in the first position, the knob does not extend beyond a vertical plane formed by a front panel of the cooking apparatus.

6. The system of claim 3, wherein the first drain lever indicator is positioned adjacent to the first drain lever, and the second drain lever indicator is positioned adjacent to the second drain lever.

7. The system of claim 3, wherein the first drain lever indicator comprises a first knob, and the second drain lever indicator comprises a second knob, and wherein the first drain lever indicator is positioned on the first knob, and the second drain lever indicator is positioned on the second knob.

8. The system of claim 3, wherein the first drain lever indicator and the second drain lever indicator are LED lights.

9. The system of claim 3, wherein the first drain lever indicator and the second drain lever indicator are audible tone generators.

10. The system of claim 3, further comprising a visual control readout device, wherein the first drain lever indicator and the second drain lever indicator are positioned on the visual control readout device.

11. The system of claim 3, wherein the controller is configured to operate the first drain lever indicator to produce an indication when the first drain lever is in an incorrect position relative to a requested fryer operation.

12. The system of claim 3, wherein the controller is configured to operate the first drain lever indicator to produce an indication when the controller initiates a filtering operation of cooking medium within the first cooking vessel.

13. The system of claim 3, wherein the controller is configured to operate the first drain lever indicator to produce an indication when the first drain lever is operated, and to operate the second drain lever indicator to produce an indication when the second drain lever is operated.

14. The system of claim 3, wherein the controller is configured to operate the first drain lever indicator to produce an indication that cooking medium within the first cooking vessel should be replaced, and to operate the second drain lever indicator to produce an indication that cooking medium within the second cooking vessel should be replaced.

15. The system of claim 3, wherein the first drain lever is directly coupled to the first drain valve via a first drain valve stem crank, and the second drain lever is directly coupled to the second drain valve via a second drain valve stem crank.

16. A system for delivering and filtering a cooking medium of a cooking apparatus, comprising:
a plurality of cooking vessels;
a drain manifold configured to be in fluid communication with the plurality of cooking vessels;
a drain container configured to store used cooking medium, and configured to selectively be in fluid communication with the drain manifold via a first flow path;
a plurality of drain valves, each drain valve configured to selectively place a respective one of the plurality of cooking vessels in fluid communication with the at least one drain container;
a plurality of drain levers respectively coupled to the plurality of drain valves, each drain lever configured to selectively open and close a corresponding one of the plurality of drain valves;
a plurality of drain lever indicators, each configured to indicate an operational status of a corresponding one of the plurality of cooking vessels;
a filter pump configured to pump the cooking medium in the drain container back into the cooking vessel, and
a controller configured to monitor the status of each of the plurality of cooking vessels, and each of the plurality of drain valves, wherein when one of the plurality of drain levers is operated, the controller produces an indication on the corresponding drain lever indicator when any of the drain valves not corresponding to the operated drain lever is already open.

17. The system of claim 16, wherein the indication on the corresponding drain lever indicator is a visual and audible indication.

18. The system of claim 16, wherein when the controller produces an indication on the corresponding drain lever indicator, the controller operates a mechanical interlock to prevent the corresponding drain valve from opening.

19. The system of claim 16, wherein the controller is configured to cause each of the plurality of corresponding drain lever indicators to indicate an action to be taken to complete a predetermined operation on the plurality of cooking vessels.

20. The system of claim 19, wherein the predetermined operation is a filtering operation.

* * * * *